Patented June 15, 1937

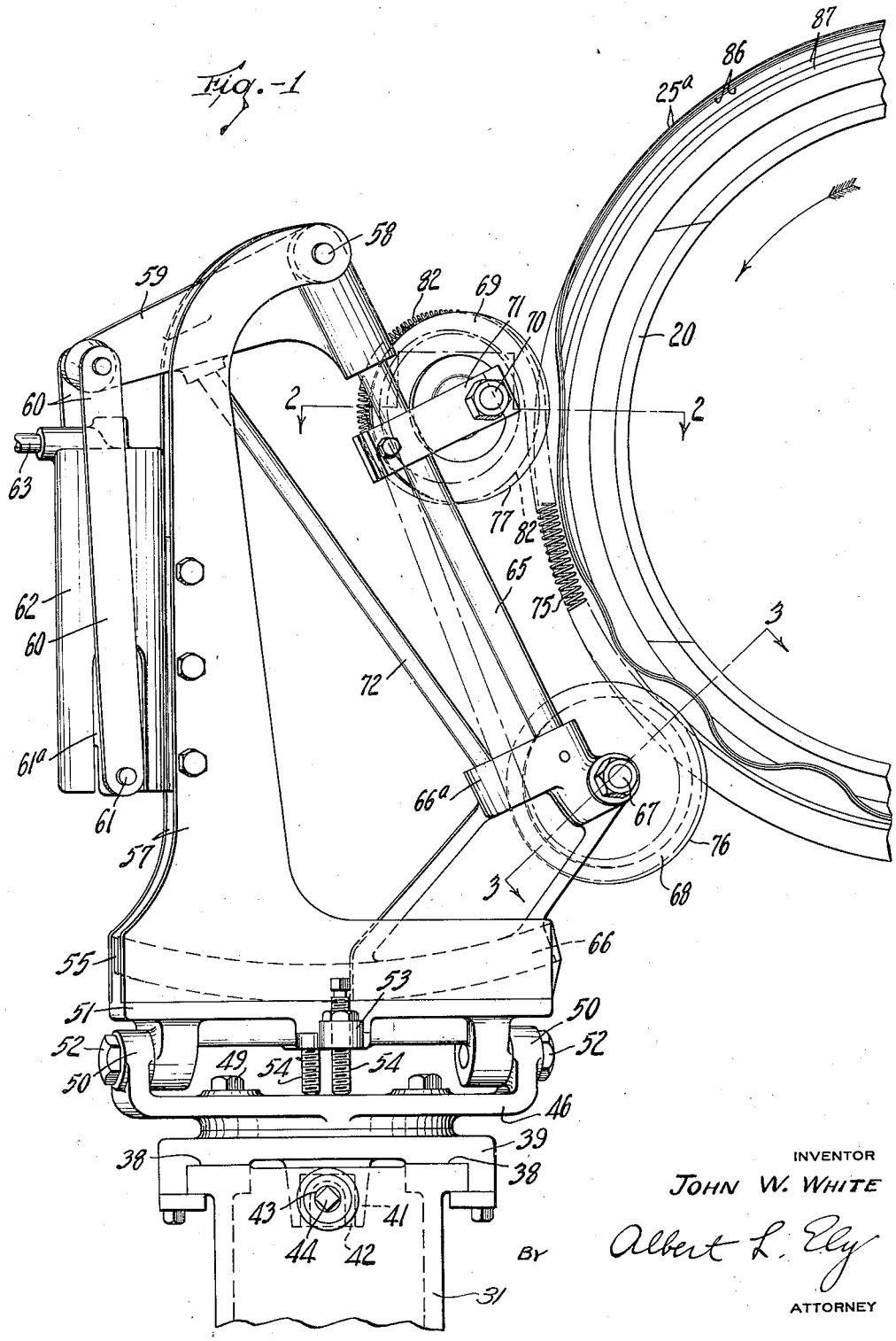

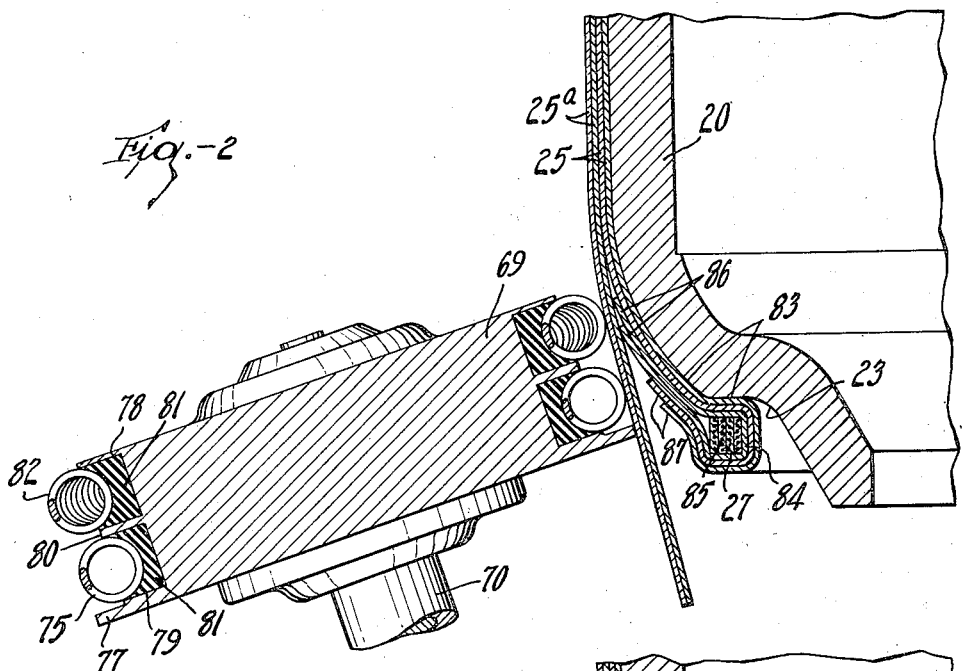
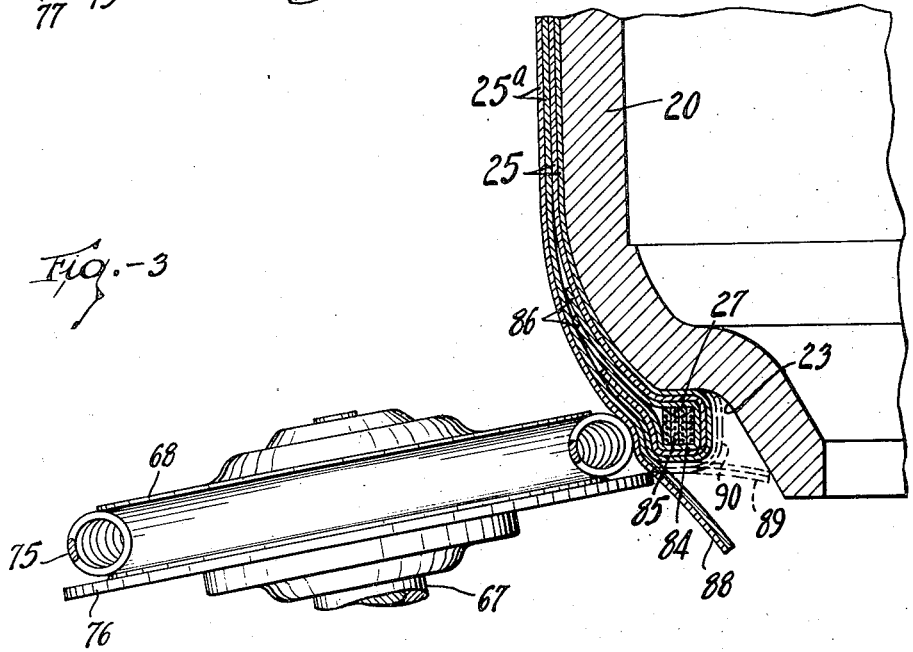

2,083,886

UNITED STATES PATENT OFFICE 2,083,886

SPRING BELT STITCHER

John W. White, Wadsworth, Ohio, assignor to Paul A. Frank, Akron, Ohio

Application September 29, 1934, Serial No. 746,077

14 Claims. (Cl. 154—10)

This invention relates to an apparatus for building pneumatic tire casings and more particularly to an improvement in stitching mechanisms employed in stitching down the fabric plies of a tire carcass about the bead regions during fabrication of the tire casing.

The stitching mechanism embodying the present invention is preferably designed for use with tire building machines which employ crowned or semi-flat tire building forms or drums having circumferential bead seats of reduced diameter upon the opposite ends of the drum and which when moved into engagement with the rotating drum more efficiently stitches the fabric plies about the bead than heretofore.

An object of the present invention is to provide in a stitching mechanism of the type referred to, an endless, extensible member cooperating with the rotatable drum for fulling or compacting the fabric plies as it folds them into place and a relatively irresistible member operating cofunctionally with the endless, extensible member for securing the fabric plies around the beads.

A further object of the present invention is to provide a stitching mechanism which is simple in construction, efficient in operation and relatively inexpensive to manufacture.

With the objects above indicated and other objects hereinafter explained in view, the invention consists in the construction and combination of elements hereinafter described and claimed.

Referring to the drawings,

Figure 1 is a fragmentary, side elevational view of a tire building machine employing a stitching mechanism embodying the present invention;

Figure 2 is a fragmentary, transverse, sectional view taken on line 2—2 of Figure 1 showing one portion of the stitching mechanism; and Figure 3 is a fragmentary, transverse, sectional view taken on line 3—3 of Figure 1 showing the operation of the irresistible member upon the fabric plies.

While the stitching mechanism embodying the present invention may be employed with various types of tire building machines, it was especially designed for operation with the tire building machine illustrated and described in the United States patent to Florain J. Shook No. 1,981,828, dated November 20, 1934 and constitutes an improvement thereover. Inasmuch as the stitching mechanism embodying the present invention is simple and specific in itself only so much of the structure of the tire building machine is herein illustrated as will fully acquaint those skilled in the art with the utility of the invention, and reference should be had to the Shook patent for a more complete disclosure and operation of the tire building machine in the production of tire casings.

In the drawings, the numeral 20 designates an annular, sectional, tire building drum or form of the conventional type which is mounted upon a collapsible chuck, the latter in turn being mounted upon a rotatable spindle constituting a part of a tire building machine (not shown). The drum 20 is of the usual "shoulder" type having circumferential grooves or bead seats 23, 23 of reduced diameter adjacent its lateral margins. While the various views of the drawings illustrate fragmentary portions of the drum 20, it should be understood that the drum is symmetrical in construction.

Referring to Figure 1, a base casting or housing 31 is slidably mounted upon a base plate (not shown) and provided with means whereby the base casting 31 may be moved toward or away from the drum 20 for a purpose to be later described.

The upper portion of the base casting 31 is extended laterally upon opposite sides and projects beyond the lateral margins of the drum 20. Slideways 38 are formed upon the upper surface of the base casting 31 and support a pair of carriages or slides 39, 39, only one of which is herein shown, slidably mounted thereon at the extreme opposite ends of the lateral extensions. These slides 39 have downwardly projecting, forked lugs 41, 41 which embrace nuts 42, 42. A screw 43 is journaled in the upper portion of the base casting 31 and is formed with right and left hand external screw threads which engage the nuts 42, 42 of the respective carriages 39, 39. The screw 43 has a squared end portion 44 exteriorly of the base casting 31 for the reception of a suitable tool (not shown) by which the screw 43 may be turned to move the carriages 39, 39 conveniently toward and away from each other, whereby the carriages 39, 39 may be aligned with different size drums. Inasmuch as the construction of the carriages and arrangement of the mechanisms carried thereby are identical, a description of one will suffice for both.

Mounted on the carriage 39 is a turntable 46 which has limited pivotal movement about a vertical axis in opposite directions. At diametrically opposite ends the turntable 46 is formed with radially extending arms 50, 50, having horizontal, axially aligned apertures which constitute journal brackets for a support and guide structure 51, the apertures being disposed transversely with respect to the axis of the drum 20.

The support and guide structure 51 is pivotally supported on pivot members 52, 52 journaled in the apertures of the arms 50, 50. The structure 51 has laterally extending arms 53, 53 diametrically opposite provided with threaded openings which receive set-screws 54, 54 by means of which the structure 51 may be adjusted angularly about the axis of the members 52, 52. The structure 51 has an arcuate guide slot 55 open at its upper end and is disposed in parallelism with the axis of the pivot members 52, 52.

A pair of upwardly extending, parallel, spaced side plates 57, 57 have their lower ends welded or otherwise secured to the opposite sides of the structure 51, the upper end portions of the plates being curved toward the drum 20 and having a pivot pin 58 secured therein. A bell crank lever 59 is pivotally mounted upon the pin 58 and has a rearwardly extending arm 59 pivotally connected to the upper ends of a pair of links 60, 60, while the lower ends of the links are pivotally connected to a cross head 61 provided upon the outer end of a piston 61ª of a one-way fluid pressure operated cylinder 62 which is mounted upon the outer sides of the side plates 57. The cylinder 62 is provided with the usual fluid inlet and outlet pipe 63, the arrangement being such that the weight of the mechanism carried by the lever 59 restores it and the piston 61ª to normal inoperative position when fluid is exhausted from the cylinder.

The other arm of the bell crank lever 59 carries a rod 65 that extends substantially downwardly and at its lower, free end is a slipper 66 slidably disposed in the slot 55, the length of the latter being such that the slipper remains in the slot throughout all positions of the lever 59. The slipper 66 is formed with a bearing bracket 66ª which carries a stub shaft 67 on which a peripherally grooved sheave 68 is journaled. A block 71 is slidably mounted for angular and longitudinal adjustment on the upper portion of the rod 65 and carries a stub shaft 70 at its free end on which a sheave 69 is journaled. A brace 72 connecting the lever 59 to the slipper 66 is provided for strengthening the structure. The arrangement is such that the rod 65 is oscillated by the charging and discharging of the cylinder 62.

The sheaves 68, 69 have an endless, extensible, helical spring 75 trained thereabout which is normally under sufficient tension to keep it taut. The adjustable characteristic of the base member 31, carriage 39, turntable 46, support and guide structure 51 and block 71, in combination with the pivotal movement of the lever 59 makes it possible to move the spring 75 into operative relation with respect to the work at practically any angular position desired.

The construction so far described is one type of tire building apparatus with which the present invention may be employed, but of course the improvement may be adapted for tire building apparatus of other well-known types.

More specifically the invention resides in a more efficient manner of stitching the bead portions of the tire carcass. The lower sheave 68 is provided with a circumferential flange 76 formed integral at one side thereof and of sufficient diameter to extend beyond the outer surface of the adjacent portions of the spring 75, as more clearly shown in Figure 3.

The upper sheave 69 is of the double groove type and also has a circumferential flange 77 formed integral therewith at one side and of sufficient diameter to extend substantially concurrently with the adjacent portions of the spring 75 and in this case to prevent disengagement of the spring 75 from the groove in the sheave irrespective of the angular position to which the sheave may be adjusted. The sheave 69 is provided with circumferential recesses 78 and 79 spaced apart by a circumferential rib 80 and blocks of resilient material 81, such as rubber, are secured in the recesses and have circumferential grooves provided in their outer surfaces, one of which receives the spring 75. A second endless coiled spring 82 is mounted on the sheave 69 within the groove of the block 81 for a purpose to be later described.

The operation of the spring 75 upon the work is best shown in Figures 2 and 3. It will be observed that the sheaves 68 and 69 are disposed at suitable angles with relation to each other and to the work and so offset from each other that the spring 75 first engages the work where the shoulder of the drum approximates its greatest diameter and then follows down over the shoulder into the groove or bead seat 23 of the drum. The effect of such application of the spring 75 to the work is to bow and stretch or elongate the spring between the sheaves 68, 69 and thereby somewhat to open the coils thereof as is most clearly shown in Figure 1. The drum being rotated in the direction indicated by the arrow, the marginal portion of the fabric plies are carried into engagement with the spring 75, the drive of the work serving to move the spring 75 along with the work and thereby rotate the sheaves 68 and 69. The angle of the spring 75 with respect to the movement of the work is such that the spring is caused to rotate on its longitudinal axis concurrently with its longitudinal movement along said axis, with the result that there is no sliding friction of the spring against the work, the latter being rolled down by the spring over the shoulder of the drum and pressed into the groove or bead seat 23 thereof.

In operation the inner plies 25 are placed upon the drum 20 in the usual manner and the drum being rotated in the direction of the arrow, the rod 65 is oscillated about its pivot 58 bringing the spring 75 into engagement with the drum. This causes the outer edge of the plies to be turned down as indicated at 83 with the extreme outer edge portion extending substantially axially outwardly. In this arrangement the bead member 27 is formed separately and consists of a flipper comprising a ply of fabric 84 enclosing a hoop-shaped reinforcing member 85 of the usual material, the free ends of the flipper terminating in an annular flange 86. The bead member 27 is placed upon the end of the drum and over the adjacent edge portion of the plies with the reinforcing member 85 located upon the bead seat 23 and the flange 86 extending inwardly and resting upon the adjacent portions of the plies, as shown in Figure 2. The drum being rotated in the same direction brings the free edge of the plies into engagement with a plow and turn-up tool (not shown) which folds the end of the plies around the bead as indicated at 87 securely stitching the same in place.

The outer plies 25ª are then placed upon the drum and over the inner plies 25. The drum is still rotated in the direction of the arrow and the spring 75 again brought into engagement with the work. This time the spring 82 engages the outer plies 25ª and stitches them down securely adjacent the end of the flange 86. Simultaneously the spring 75 functions in the manner already explained and folds the outer edge of the plies downwardly over the bead 27 as shown in Figure 3. The flange 76 on the sheave 68 is here brought into operation and folds and stitches the edge of the plies around the adjacent corner of the bead as the spring 75 at the same time stitches the plies upon the top portion of the bead. The spring 75 is then returned to its inoperative position. The drum is then rotated in the opposite direction and a stitcher (not shown) is brought into engagement with the extending edge portion 88 of the plies and turns them downwardly and stitches the same as indicated by dotted lines at 89, following which a plow (not shown) engages the down-turned edge portion and turns the latter inwardly as indicated by dot and dash lines 90, at the same time securely stitching the same in place about the bead and leaving no edge portions exposed outwardly.

The resilient blocks 81 are provided as a cushioning means for the springs 75 and 82 so that the latter will not injure the plies but at the same time will permit sufficient pressure to be exerted to efficiently stitch the plies. Furthermore the resilient blocks have a tendency to prevent any slippage between the springs and the sheaves.

The flange 77 on the upper sheave 69 tends to prevent disengagement of the spring 75 from its groove and sheave while the flange 76 on the lower sheave 68 provides a means for forming and stitching the plies about the sharp corners of the bead. The flange 76 also functions as a following operation to that of the spring 75.

While the operation of the stitching mechanism has been described as applicable to one edge of the plies, it should of course be understood that the mechanism is duplicated upon both sides and acts simultaneously on both edges in the manner heretofore described.

While I have described the preferred embodiments of the invention, it should be understood that I am not to be limited thereto inasmuch as changes and modifications may be resorted to without departing from the spirit of the invention as defined in the appended claims.

What is claimed is:

1. Tire building apparatus comprising a stitching tool consisting of an endless, flexible, extensible structure, and a pair of sheaves supporting said structure, one of said sheaves having a circumferential flange forming a stitching disc extending beyond the adjacent outer portion of said structure.

2. Tire building apparatus comprising a stitching tool consisting of an endless, flexible, extensible structure, and a pair of sheaves supporting said structure, each of said sheaves having a circumferential flange extending outwardly beyond the longitudinal axis of said structure, at least one of said flanges forming a stitching disc.

3. Tire building apparatus comprising a stitching tool consisting of an endless, flexible, extensible structure, and a pair of sheaves supporting said structure, one of said sheaves having an integral, circumferential flange forming a stitching disc extending beyond the adjacent outer portions of said structure.

4. Tire building apparatus comprising a stitching tool consisting of an endless, flexible, extensible structure, a pair of sheaves supporting said structure, one of said sheaves having a circumferential groove, and a second, endless, resilient member carried solely by said sheave and disposed in said groove.

5. Tire building apparatus comprising a stitching tool consisting of an endless, flexible, extensible structure, and a pair of sheaves supporting said structure, one of said sheaves having a circumferential groove, and an endless, coiled spring carried solely by said sheave and disposed in said groove.

6. Tire building apparatus comprising a stitching tool consisting of an endless, flexible, extensible structure, a pair of sheaves supporting said structure, one of said sheaves having a circumferential flange forming a stitching disc extending beyond the adjacent portion of said structure, the other of said sheaves having a circumferential groove, and an endless, resilient member carried solely by said sheave and disposed in said groove.

7. Tire building apparatus comprising a stitching tool consisting of an endless, flexible, extensible structure, and a pair of sheaves supporting said structure, one of said sheaves having an endless resilient means mounted solely thereon.

8. Tire building apparatus comprising a stitching tool consisting of an endless, flexible, extensible structure, a pair of sheaves supporting said structure, one of said sheaves having a circumferential recess, and a resilient member mounted in said recess and having a circumferential groove and an endless resilient member disposed solely in said groove.

9. Tire building apparatus comprising a stitching tool consisting of an endless, flexible, extensible structure, a pair of sheaves supporting said structure, one of said sheaves having a circumferential recess, and a rubber member mounted in said recess and having a circumferential groove and an endless resilient member disposed solely in said groove.

10. Tire building apparatus comprising a stitching tool consisting of an endless, flexible, extensible structure, a pair of sheaves supporting said structure, one of said sheaves having a pair of circumferential recesses, resilient members mounted in said recesses and having circumferential grooves, one of said grooves receiving said structure, and an endless, resilient member mounted on said sheave and disposed solely in the other of said grooves.

11. In combination with a tire building drum, a stitching mechanism comprising an endless, flexible, extensible member adapted for engagement with said drum, a pair of sheaves supporting said member, one of said sheaves having a circumferential, flanged member also adapted for engagement with said drum in following relation to said extensible member.

12. In combination with a tire building drum, a stitching mechanism comprising an endless, flexible, extensible member adapted for engagement with said drum, and a pair of sheaves supporting said member, one of said sheaves having a circumferential flange extending beyond the adjacent outer portions of said member and also adapted for engagement with said drum.

13. In combination with a tire building drum, a stitching mechanism comprising an endless, flexible, extensible member adapted for engagement with said drum, a pair of sheaves supporting said member, one of said sheaves having a circumferential, flanged member also adapted for engagement with said drum in following relation to said extensible member, and means for resiliently supporting the endless, flexible member.

14. In combination with a tire building drum, a stitching mechanism comprising an endless, flexible, extensible member adapted for engagement with said drum, a pair of sheaves supporting said member, one of said sheaves having a circumferential, flanged member also adapted for engagement with said drum in following relation to said extensible member, and means carried by one of said sheaves for resiliently supporting the endless, flexible member.

JOHN W. WHITE.